(12) United States Patent
Atarashi

(10) Patent No.: US 7,212,782 B2
(45) Date of Patent: May 1, 2007

(54) LOW-NOISE BLOCK DOWN-CONVERTER AND SATELLITE BROADCASTING RECEIVING APPARATUS

(75) Inventor: Hiroshi Atarashi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 378 days.

(21) Appl. No.: 10/822,698

(22) Filed: Apr. 13, 2004

(65) Prior Publication Data

US 2004/0235415 A1 Nov. 25, 2004

(30) Foreign Application Priority Data

May 23, 2003 (JP) ............................. 2003-146700

(51) Int. Cl.
*H04H 1/00* (2006.01)
*H04B 7/185* (2006.01)
*H04B 7/14* (2006.01)

(52) U.S. Cl. .................. 455/3.01; 455/3.02; 455/13.3; 455/22

(58) Field of Classification Search ...... 455/3.01–3.06, 455/132–140, 191.1, 323, 334, 427–430, 455/12.1–13.4, 20–22
See application file for complete search history.

(56) References Cited

U.S. PATENT DOCUMENTS

| | | | | |
|---|---|---|---|---|
| 6,600,730 | B1 * | 7/2003 | Davis et al. ................. | 370/343 |
| 6,763,223 | B1 * | 7/2004 | Hirabayashi et al. ....... | 455/3.02 |
| 6,832,071 | B1 * | 12/2004 | Nakamura et al. ......... | 455/3.02 |
| 6,985,695 | B1 * | 1/2006 | Kato ........................ | 455/3.02 |
| 2003/0199246 | A1 * | 10/2003 | Friedman et al. ........... | 455/3.01 |
| 2004/0029549 | A1 * | 2/2004 | Fikart ........................ | 455/323 |
| 2004/0259497 | A1 * | 12/2004 | Dent ........................ | 455/13.3 |

FOREIGN PATENT DOCUMENTS

| | | |
|---|---|---|
| JP | 5-315989 | 11/1993 |
| JP | 5-316062 | 11/1993 |

* cited by examiner

*Primary Examiner*—Simon Nguyen
(74) *Attorney, Agent, or Firm*—Nixon & Vanderhye, PC

(57) ABSTRACT

Frequency converting circuits each correspond to one satellite and convert frequency bands of two types of polarization signals received from the corresponding satellite into two intermediate frequency bands that do not overlap with each other. Signal couplers each correspond to one satellite and perform frequency-multiplexing of the two types of polarization signals from the corresponding satellite having their frequency bands converted, to generate a first combined signal. A signal rearranging circuit selects any two first combined signals from the two first combined signals allowing duplicate selection, and takes out any one polarization signal from each of the selected first combined signals, and performs frequency-multiplexing of the taken out two polarization signals to generate a second combined signal.

17 Claims, 10 Drawing Sheets

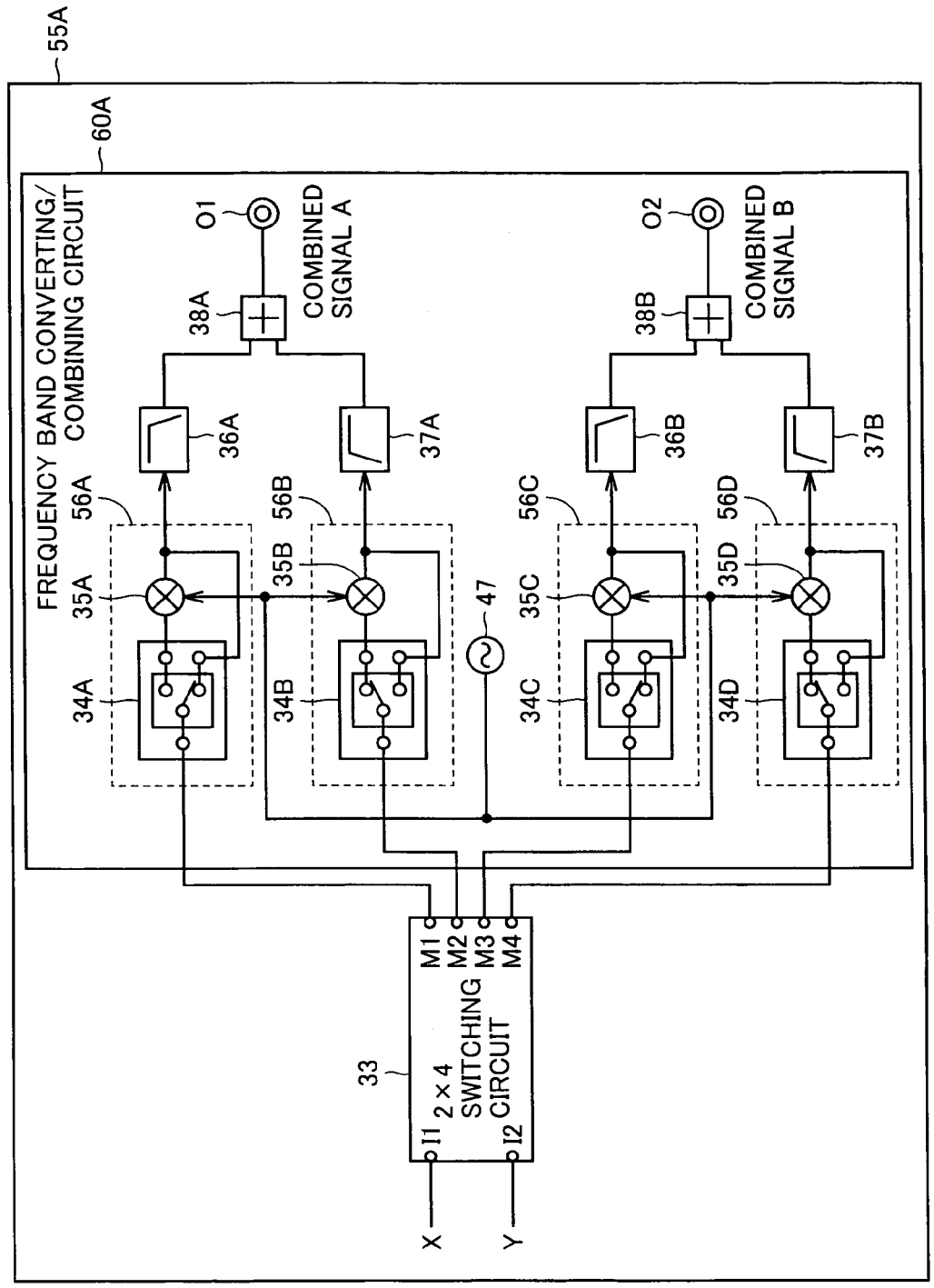

FIG.4

| LOW BAND SIDE | HIGH BAND SIDE |
|---|---|
| 110° RIGHT-HAND POLARIZATION SIGNAL | 110° RIGHT-HAND POLARIZATION SIGNAL |
| 110° RIGHT-HAND POLARIZATION SIGNAL | 110° LEFT-HAND POLARIZATION SIGNAL |
| 110° RIGHT-HAND POLARIZATION SIGNAL | 119° RIGHT-HAND POLARIZATION SIGNAL |
| 110° RIGHT-HAND POLARIZATION SIGNAL | 119° LEFT-HAND POLARIZATION SIGNAL |
| 110° LEFT-HAND POLARIZATION SIGNAL | 110° RIGHT-HAND POLARIZATION SIGNAL |
| 110° LEFT-HAND POLARIZATION SIGNAL | 110° LEFT-HAND POLARIZATION SIGNAL |
| 110° LEFT-HAND POLARIZATION SIGNAL | 119° RIGHT-HAND POLARIZATION SIGNAL |
| 110° LEFT-HAND POLARIZATION SIGNAL | 119° LEFT-HAND POLARIZATION SIGNAL |
| 119° RIGHT-HAND POLARIZATION SIGNAL | 110° RIGHT-HAND POLARIZATION SIGNAL |
| 119° RIGHT-HAND POLARIZATION SIGNAL | 110° LEFT-HAND POLARIZATION SIGNAL |
| 119° RIGHT-HAND POLARIZATION SIGNAL | 119° RIGHT-HAND POLARIZATION SIGNAL |
| 119° RIGHT-HAND POLARIZATION SIGNAL | 119° LEFT-HAND POLARIZATION SIGNAL |
| 119° LEFT-HAND POLARIZATION SIGNAL | 110° RIGHT-HAND POLARIZATION SIGNAL |
| 119° LEFT-HAND POLARIZATION SIGNAL | 110° LEFT-HAND POLARIZATION SIGNAL |
| 119° LEFT-HAND POLARIZATION SIGNAL | 119° RIGHT-HAND POLARIZATION SIGNAL |
| 119° LEFT-HAND POLARIZATION SIGNAL | 119° LEFT-HAND POLARIZATION SIGNAL |

FIG.8

| LOW BAND SIDE | HIGH BAND SIDE |
|---|---|
| 110° RIGHT-HAND POLARIZATION SIGNAL | 110° LEFT-HAND POLARIZATION SIGNAL |
| 110° RIGHT-HAND POLARIZATION SIGNAL | 119° LEFT-HAND POLARIZATION SIGNAL |
| 119° RIGHT-HAND POLARIZATION SIGNAL | 110° LEFT-HAND POLARIZATION SIGNAL |
| 119° RIGHT-HAND POLARIZATION SIGNAL | 119° LEFT-HAND POLARIZATION SIGNAL |

FIG.10 PRIOR ART

| LOW BAND SIDE | HIGH BAND SIDE |
|---|---|
| 110° RIGHT-HAND POLARIZATION SIGNAL | 110° LEFT-HAND POLARIZATION SIGNAL |
| 119° RIGHT-HAND POLARIZATION SIGNAL | 119° LEFT-HAND POLARIZATION SIGNAL |

US 7,212,782 B2

LOW-NOISE BLOCK DOWN-CONVERTER AND SATELLITE BROADCASTING RECEIVING APPARATUS

This nonprovisional application is based on Japanese Patent Application No. 2003-146700 filed with the Japan Patent Office on May 23, 2003, the entire contents of which are hereby incorporated by reference.

BACKGROUND OF THE INVENTION

1. Field of the Invention

The present invention relates to a low-noise block down-converter (hereinafter referred to as an LNB) and a satellite broadcasting receiving apparatus, and specifically, to an LNB and a satellite broadcasting receiving apparatus suitable for receiving a plurality of types of polarization signals transmitted from each of a plurality of satellites.

2. Description of the Background Art

Conventionally, an LNB for receiving two polarization signals transmitted from a satellite and converting the polarization signals into intermediate frequencies has been developed.

For example, Japanese Patent Laying-Open No. 5-315989 discloses an LNB that receives two polarization signals and converts the frequency of one polarization signal into a normal frequency, and converts the frequency of the other polarization signal into a frequency shifted by a certain amount from the normal frequency. Then, the LNB performs frequency-multiplexing of these frequency-converted signals to be output as one signal.

Thus, two polarization signals transmitted from one satellite can be output to a tuner through one cable.

Currently, at west longitude 101°, 110° and 119° in the sky of the United States, digital broadcasting satellites (DBSs) are launched. EchoStar (EchoStar is a trademark of EchoStar Communications Corporation, USA), one of service providers of DBS broadcastings in the United States, has obtained broadcasting rights of the satellites at west longitude 110° and 119°, and has been providing satellite broadcastings. Therefore, an LNB that receives polarization signals from such two satellites and converts these polarization signals into intermediate frequencies is required.

FIG. 9 shows a configuration of an LNB in which the LNB disclosed in Japanese Patent Laying-Open No. 5-315989 is expanded to be capable of receiving polarization signals transmitted from two satellites. Referring to FIG. 9, LNB 500 includes low-noise amplifiers 3A, 3B, 4A, and 4B, image-remove filtering circuits 5A, 5B, 6A, and 6B, local oscillators 13 and 14, frequency converting circuit 30A and 30B, signal couplers 11A and 11B, a 2×2 switching circuit 15, a microcomputer 46, intermediate frequency amplifiers 17A and 17B, capacitors 18A and 18B, output terminals 20A and 20B, and power source circuit 22.

To LNB 500, a left-hand polarization signal transmitted from the satellite at west longitude 119° (hereinafter referred to as "119° left-hand polarization signal" and "119° satellite", respectively), a right-hand polarization signal transmitted from 119° satellite (hereinafter referred to as "119° right-hand polarization signal"), a left-hand polarization signal transmitted from the satellite at west longitude 110° (hereinafter referred to as "110° left-hand polarization signal" and "110° satellite", respectively), and a right-hand polarization signal transmitted from 110° satellite (hereinafter referred to as "110° right-hand polarization signal") are input. The frequencies of these input signals are included in the 0th frequency band (12.2 GHz–12.7 GHz).

Low-noise amplifier 3A receives 119° left-hand polarization signal and performs low-noise amplification thereof. Low-noise amplifier 4A receives 119° right-hand polarization signal and performs low-noise amplification thereof. Low-noise amplifier 4B receives 110° right-hand polarization signal and performs low-noise amplification thereof. Low-noise amplifier 3B receives 110° left-hand polarization signal and performs low-noise amplification thereof.

Image-remove filtering circuits 5A, 6A, 6B, and 5B remove image signals from low-noise amplified 119° left-hand polarization signal, low-noise amplified 119° right-hand polarization signal, low-noise amplified 110° right-hand polarization signal, and low-noise amplified 110° left-hand polarization signal, respectively.

Local oscillators 13 and 14 generate sine-wave signals (local oscillator signals) of 11.25 GHz, 14.35 GHz, respectively.

Frequency converting circuit 30A corresponds to 119° satellite, and includes mixers 7A and 8A, a high pass filter 9A and a low pass filter 10A, and converts the frequency bands of 119° left-hand polarization signal and 119° right-hand polarization signal into two intermediate frequency (IF) bands that do not overlap with each other.

Mixer 7A mixes 119° left-hand polarization signal, of which frequency is included in the 0th frequency band (12.2–12.7 GHz) and which has been low-noise amplified and removed of image signals, and a local oscillator signal of 14.35 GHz, to output 119° left-hand polarization signal of which frequency is included in a first IF frequency band (frequency 1650 MHz–2150 MHz, hereinafter also referred to as "high band").

Mixer 8A mixes 119° right-hand polarization signal, of which frequency is included in the 0th frequency band (12.2–12.7 GHz) and which has been low-noise amplified and removed of image signals, and a local oscillator signal of 11.25 GHz, to output 119° right-hand polarization signal of which frequency is included in a second IF frequency band (frequency 950 MHz–1450 MHz, hereinafter also referred to as "low band").

High pass filter 9A passes 119° left-hand polarization signal, of which frequency is included in the first IF frequency band, and which is output from mixer 7A.

Low pass filter 10A passes 119° right-hand polarization signal, of which frequency is included in the second IF frequency band, and which is output from mixer 8A.

Frequency converting circuit 30B corresponds to 110° satellite, and includes mixers 7B and 8B, a high pass filter 9B and a low pass filter 10B, and converts the frequency bands of 110° left-hand polarization signal and 110° right-hand polarization signal into two intermediate frequency (IF) bands that do not overlap with each other.

Mixer 8B mixes 110° right-hand polarization signal, of which frequency is included in the 0th frequency band (12.2–12.7 GHz) and which has been low-noise amplified and removed of image signals, and a local oscillator signal of 11.25 GHz, to output 110° right-hand polarization signal of which frequency is included in the second IF frequency band.

Mixer 7B mixes 110° left-hand polarization signal, of which frequency is included in the 0th frequency band (12.2–12.7 GHz) and which has been low-noise amplified and removed of image signals, and a local oscillator signal of 14.35 GHz, to output 110° left-hand polarization signal of which frequency is included in a first IF frequency band.

High pass filter 9B passes 110° left-hand polarization signal of which frequency is included in the first IF frequency band, and which is output from mixer 7B.

Low pass filter 10B passes 110° right-hand polarization signal of which frequency is included in the second IF frequency band, and which is output from mixer 8B.

Signal coupler 11A corresponds to 119° satellite, and performs frequency-multiplexing of 119° left-hand polarization signal that has passed high pass filter 9A and 119° right-hand polarization signal that has passed low pass filter 10A, to output a combined 119° signal. Accordingly, combined 119° signal is a signal in which 119° left-hand polarization signal is arranged on high-band side, and 119° right-hand polarization signal is arranged on low-band side.

Signal coupler 11B corresponds to 110° satellite, and performs frequency-multiplexing of 110° right-hand polarization signal that has passed low pass filter 10B and 110° left-hand polarization signal that has passed high pass filter 9B, to output a combined 110° signal. Accordingly, combined 110° signal is a signal in which 110° left-hand polarization signal is arranged on high-band side, and 110° right-hand polarization signal is arranged on low-band side.

2×2 switching circuit 15 operates at IF frequency band (frequency 950 MHz∫2150 MHz). 2×2 switching circuit 15 receives combined 119° signal and combined 110° signal at terminals I1 and I2, respectively. 2×2 switching circuit 15 follows the instruction of microcomputer 46 and outputs combined 119° signal or combined 110° signal to each of terminals O1 and O2.

Intermediate frequency amplifiers 17A and 17B amplify output signals of terminals O1 and O2, respectively.

Capacitors 18A and 18B remove low-frequency noise of output signals of intermediate frequency amplifiers 17A and 17B, respectively.

Power source circuit 22 supplies power to components of LNB 500.

Output terminal 20A outputs an output signal of terminal O1 that has been amplified and removed of low-frequency noise (i.e., combined 119° signal or combined 110° signal) to tuner 1. Output terminal 20B outputs an output signal of terminal O2 that has been amplified and removed of low-frequency noise (i.e., combined 119° signal or combined 110° signal) to tuner 2.

FIG. 10 shows combinations of signals that can be output simultaneously through one cable by LNB 500. As shown in FIG. 10, combinations of signals that can be output are two, since LNB 500 outputs combined 110° signal (110° right-hand polarization signal on low-band side and 110° left-hand polarization signal on high-band side), or combined 119° signal (119° right-hand polarization signal on low-band side and 119° left-hand polarization signal on high-band side).

As described above, by LNB 500, combined 119° signal in which 119° right-hand polarization signal and 119° left-hand polarization signal are combined, or combined 110° signal in which 110° right-hand polarization signal and 110° left-hand polarization signal are combined can be output to tuners 1 and 2.

However, with LNB 500 as described above, what is simultaneously transmitted to a tuner through one cable are 119° right-hand polarization signal and 119° left-hand polarization signal, or 110° right-hand polarization signal an 110° left-hand polarization signal.

Specifically, with one cable, polarization signals of either 119° satellite or 110° satellite only can be transmitted simultaneously, and polarization signals from two satellites, such as 119° right-hand polarization signal and 110° left-hand polarization signal can not be output simultaneously.

SUMMARY OF THE INVENTION

Accordingly, an object of the present invention is to provide an LNB capable of outputting not only polarization signals from one satellite but also polarization signals from a plurality of satellites simultaneously through one cable, and a satellite broadcasting receiving apparatus using such an LNB.

According to an aspect of the present invention, a low-noise block down-converter receiving M (M≧2) types of polarization signals from each of N (N≧2) satellites includes: N frequency converting circuits each corresponding to one satellite and converting frequency bands of M types of polarization signals received from the corresponding satellite into M intermediate frequency bands that do not overlap one another; N first signal couplers each corresponding to one satellite and performing frequency-multiplexing of the M types of polarization signals from the corresponding satellite having their frequency bands converted, to generate a first combined signal; a signal rearranging circuit selecting any M first combined signals from N of the first combined signals allowing duplicate selection, taking out any one polarization signal from each of the selected first combined signals, and performing frequency-multiplexing of the taken out M polarization signals to generate a second combined signal.

According to another aspect of the present invention, a low-noise block down-converter includes: a switching circuit including N×M (N≧2, M ≧2) input terminals and M output terminals, receiving M types of polarization signals from each of N satellites, and outputting any of the received polarization signals to each of M output terminals; a frequency converting circuit converting frequency bands of M polarization signals output from the switching circuit into M intermediate frequency bands that do not overlap with one another; and a signal coupler performing frequency-multiplexing of the M polarization signals having their frequency bands converted, to generate a combined signal.

According to still another aspect of the present invention, a low-noise block down-converter receiving M (M≧2) types of polarization signals from each of N (N≧2) satellites includes: N frequency converting circuits each corresponding to one satellite and converting frequency bands of M types of polarization signals received from the corresponding one satellite into M intermediate frequency bands that do not overlap one another; M switching circuits each corresponding to a type of the polarization signals, and receiving a corresponding one type of the polarization signals from N satellites having its frequency band converted, and outputting any of the received polarization signals; and a signal coupler receiving the M polarization signals from the M switching circuits and performing frequency multiplexing of the M polarization signals to generate a combined signal.

According to still another aspect of the present invention, a satellite broadcasting receiving apparatus receiving M (M≧2) types of polarization signals from each of N (N≧2) satellites includes: a low-noise block down-converter including N frequency converting circuits each corresponding to one satellite and converting frequency bands of M types of polarization signals received from the corresponding satellite into M intermediate frequency bands that do not overlap one another, N signal couplers each corresponding to one satellite and performing frequency-multiplexing of the M types of polarization signals from the corresponding satellite having their frequency bands converted, to generate a first combined signal, and a signal rearranging circuit selecting any M first combined signals from N of the first combined signals allowing duplicate selection, taking out any one polarization signal from each of the selected first combined signals, and performing frequency-multiplexing of the taken out M polarization signals to generate a second combined signal; and a tuner receiving the second combined signal output from the low-noise block down-converter, and performing a tuning process and a decoding process based on the second combined signal.

As described above, according to the low-noise block down-converter and the satellite broadcasting receiving apparatus of the present invention, not only polarization signals from one satellite but also polarization signals from a plurality of satellites can be output simultaneously through one cable.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows a detailed configuration of a signal rearranging circuit.

FIG. 4 shows combinations of signals that can be simultaneously output through one cable by LNB.

FIG. 8 shows combinations of signals that can be simultaneously output through one cable by LNB.

FIG. 10 shows combinations of signals that can be output simultaneously through one cable by LNB.

DESCRIPTION OF THE PREFERRED EMBODIMENTS

Figure 1:
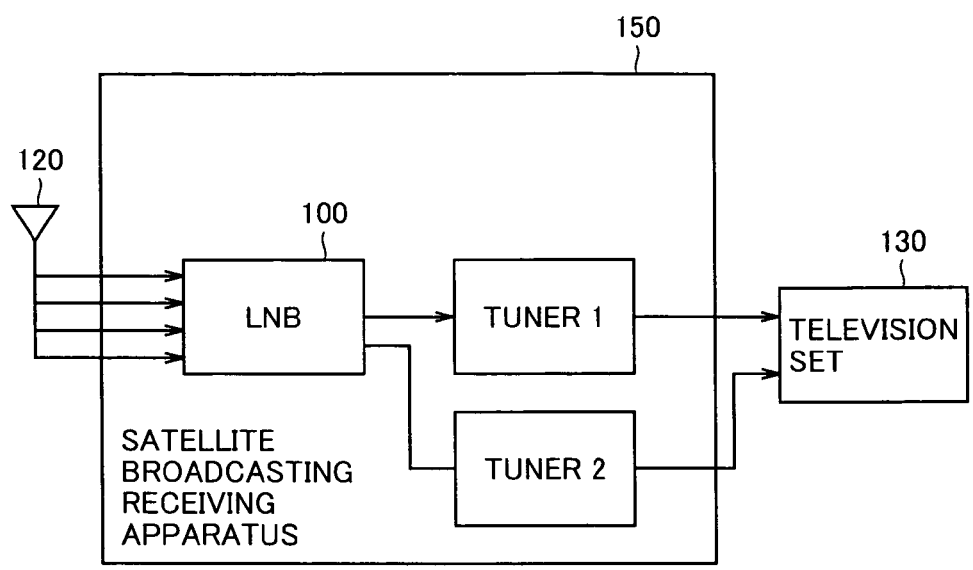
FIG. 1 shows a configuration of a satellite broadcasting receiving apparatus according to a first embodiment of the present invention.

In the following, embodiments of the present invention will be described referring to the drawings.

First Embodiment

The present embodiment is related to an LNB that can output polarization signals from two satellites simultaneously through one cable.

(Configuration of Satellite Broadcasting Receiving Apparatus)

FIG. 1 shows a configuration of a satellite broadcasting receiving apparatus according to a first embodiment of the present invention. Referring to FIG. 1, satellite broadcasting receiving apparatus 150 includes an LNB 100 and tuners 1 and 2.

LNB 100 receives 119° left-hand polarization signal, 119° right-hand polarization signal, 110° left-hand polarization signal, and 110° right-hand polarization signal, of which frequencies are in the 0th frequency band, from antenna 120, and produces two output signals of IF frequency bands.

Tuners 1 and 2 each perform, on signals produced from LNB 100, a tuning process for extracting the frequency components of a specified channel to tune, and a decoding process for decoding a video signal and an audio signal from the tuned signal.

A television set 130 receives the video signal and the audio signal from tuner 1 or tuner 2 and provides the program of the specified channel.

(Configuration of LNB 100)

Figure 2:
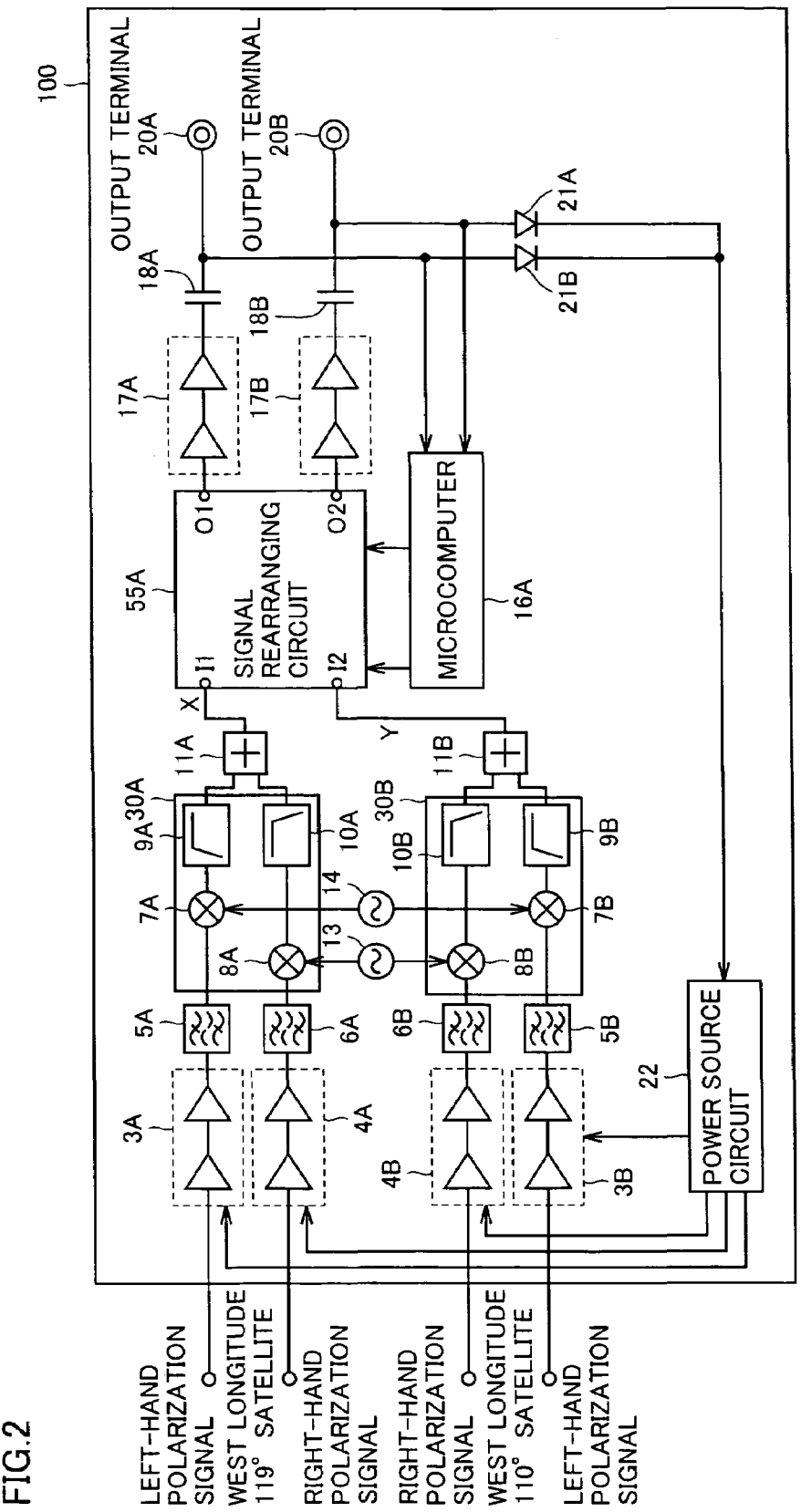
FIG. 2 shows a configuration of an LNB according to the first embodiment of the present invention.
Figure 9:
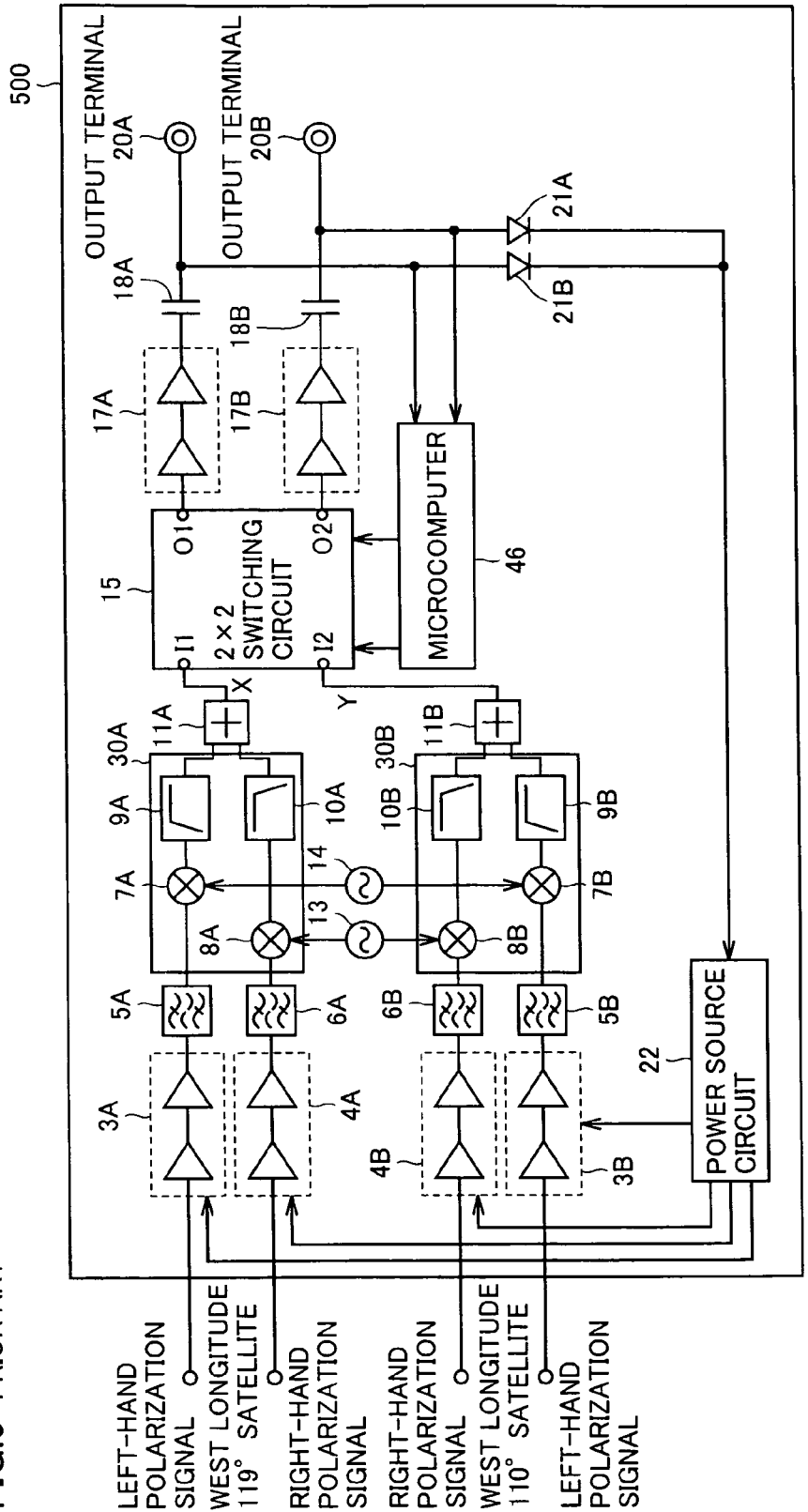
FIG. 9 shows a configuration of an LNB in which the LNB disclosed in Japanese Patent Laying-Open No. 5-315989 is expanded to be capable of receiving polarization signals transmitted from two satellites.

FIG. 2 shows a configuration of an LNB according to the first embodiment of the present invention. LNB 100 is different from the conventional LNB 500 shown in FIG. 9 in that LNB 100 includes a signal rearranging circuit 55A in place of 2×2 switching circuit 15, and includes a microcomputer 16A in place of microcomputer 46. In the following, these differences are described.

(Configuration of Signal Rearranging Circuit 55A)

Signal rearranging circuit 55A selects two signals for one output from combined 119° signal and combined 110° signal, allowing duplicate selection. Signal rearranging circuit 55A takes out polarization signals included in each of the selected signals, and combines thus taken two polarization signals and outputs it.

FIG. 3 shows a detailed configuration of signal rearranging circuit 55A. Signal rearranging circuit 55A includes 2×4 switching circuit 33, and band converting/combining circuit 60A. Band converting/combining circuit 60A includes a local oscillator 47, frequency controlling circuits 56A, 56B, 56C, and 56D, low pass filters 36A and 36B, high pass filters 37A and 37B, and signal couplers 38A and 38B.

2×4 switching circuit 33 operates at IF frequency band (frequency 950 MHz–2150 MHz). 2×4 switching circuit 33 receives combined 119° signal and combined 110° signal at terminals I1 and I2, respectively. 2×4 switching circuit 33 follows the instruction of microcomputer 16A and outputs combined 119° signal or combined 110° signal to each of terminals M1, M2, M3, and M4. The combinations of signals output from terminals M1–M4 are $2^4$. A combined signal A is generated based on the signals output from terminals M1 and M2 and output, while a combined signal B is generated based on the signals output from terminals M3 and M4 and output.

Local oscillator 47 generates a sine-wave signal (local oscillator signal) of 3.1 GHz.

Frequency controlling circuit 56A includes switch 34A of which state is switched by microcomputer 16A, and a mixer 35A. Frequency controlling circuit 56A sets signal components included in the low-band side of the signal output from terminal M1 to a right-hand polarization signal or a left-hand polarization signal included in the output signal.

When switch 34A is off, frequency controlling circuit 56A outputs combined 119° signal or combined 110° signal output from terminal M1 without any change. Thus, the right-hand polarization signal is arranged on the low-band side of combined 119° signal or combined 110° signal output from terminal M1 without any change, and the left-hand polarization signal is arranged on the high-band side without any change.

In frequency controlling circuit 56A, when switch 34A is on, mixer 35A mixes combined 119° signal or combined 110° signal output from terminal M1 and the local oscillator signal of 3.1 GHz. Through the mixing, 950 MHz component of the signal output from terminal M1 shifts to 2150 MHz (=3100 MHz−950 MHz), 1450 MHz component shifts to 1650 MHz (=3100 MHz−1450 MHz), 1650 MHz component shifts to 1450 MHz (=3100 MHz−1650 MHz), and 2150 MHz component shifts to 950 MHz (=3100 MHz–2150 MHz). Thus, the right-hand polarization signal that has been arranged on the low-band side of combined 119° signal or combined 110° signal output from terminal M1 shifts to the high-band side, while the left-hand polarization signal that has been arranged on the high-band side shifts to the low-band side.

Low pass filter 36A passes the frequency components included in the low band of the output signal of frequency controlling circuit 56A.

Frequency controlling circuit 56B includes switch 34B of which state is switched by microcomputer 16A, and a mixer 35B. Frequency controlling circuit 56B sets signal components included in the low-band side of the signal output from terminal M2 to a right-hand polarization signal or a left-hand polarization signal included in the output signal.

When switch 34B is off, frequency controlling circuit 56B outputs combined 119° signal or combined 110° signal output from terminal M2 without any change. Thus, the right-hand polarization signal is arranged on the low-band side of combined 119° signal or combined 110° signal output from terminal M2 without any change, and the left-hand polarization signal is arranged on the high-band side without any change.

In frequency controlling circuit 56B, when switch 34B is on, mixer 35B mixes combined 119° signal or combined 110° signal output from terminal M2 and the local oscillator signal of 3.1 GHz. Through the mixing, 950 MHz component of the signal output from terminal M2 shifts to 2150 MHz (=3100 MHz–950 MHz), 1450 MHz component shifts to 1650 MHz (=3100 MHz–1450 MHz), 1650 MHz component shifts to 1450 MHz (=3100 MHz–1650 MHz), and 2150 MHz component shifts to 950 MHz (=3100 MHz–2150 MHz). Thus, the right-hand polarization signal that has been arranged on the low-band side of combined 119° signal or combined 110° signal output from terminal M2 shifts to the high-band side, while the left-hand polarization signal that has been arranged on the high-band side shifts to the low-band side.

High pass filter 37A passes the frequency components included in the high band of the output signal of frequency controlling circuit 56B.

Signal coupler 38A combines the signal that has passed low pass filter 36A and the signal that has passed the high pass filter 37A and outputs a combined signal.

Frequency controlling circuit 56C includes switch 34C of which state is switched by microcomputer 16A, and a mixer 35C. Frequency controlling circuit 56C sets signal components included in the low-band side of the signal output from terminal M3 to a right-hand polarization signal or a left-hand polarization signal included in the output signal.

When switch 34C is off, frequency controlling circuit 56C outputs combined 119° signal or combined 110° signal output from terminal M3 without any change. Thus, the right-hand polarization signal is arranged on the low-band side of combined 119° signal or combined 110° signal output from terminal M3 without any change, and the left-hand polarization signal is arranged on the high-band side without any change.

In frequency controlling circuit 56C, when switch 34C is on, mixer 35C mixes combined 119° signal or combined 110° signal output from terminal M3 and the local oscillator signal of 3.1 GHz. Through the mixing, 950 MHz component of the signal output from terminal M3 shifts to 2150 MHz (=3100 MHz–950 MHz), 1450 MHz component shifts to 1650 MHz (=3100 MHz–1450 MHz), 1650 MHz component shifts to 1450 MHz (=3100 MHz–1650 MHz), and 2150 MHz component shifts to 950 MHz (=3100 MHz–2150 MHz). Thus, the right-hand polarization signal that has been arranged on the low-band side of combined 119° signal or combined 110° signal output from terminal M3 shifts to the high-band side, while the left-hand polarization signal that has been arranged on the high-band side shifts to the low-band side.

Low pass filter 36B passes the frequency components included in the low band of the output signal of frequency controlling circuit 56C.

Frequency controlling circuit 56D includes switch 34D of which state is switched by microcomputer 16A, and a mixer 35D. Frequency controlling circuit 56D sets signal components included in the low-band side of the signal output from terminal M4 to a right-hand polarization signal or a left-hand polarization signal included in the output signal.

When switch 34D is 6off, frequency controlling circuit 56D outputs combined 119° signal or combined 110° signal output from terminal M4 without any change. Thus, the right-hand polarization signal is arranged on the low-band side of combined 119° signal or combined 110° signal output from terminal M4 without any change, and the left-hand polarization signal is arranged on the high-band side without any change.

In frequency controlling circuit 56D, when switch 34D is on, mixer 35D mixes combined 119° signal or combined 110° signal output from terminal M4 and the local oscillator signal of 3.1 GHz. Through the mixing, 950 MHz component of the signal output from terminal M4 shifts to 2150 MHz (=3100 MHz–950 MHz), 1450 MHz component shifts to 1650 MHz (=3100 MHz–1450 MHz), 1650 MHz component shifts to 1450 MHz (=3100 MHz–1650 MHz), and 2150 MHz component shifts to 950 MHz (=3100 MHz–2150 MHz). Thus, the right-hand polarization signal that has been arranged on the low-band side of combined 119° signal or combined 110° signal output from terminal M4 shifts to the high-band side, while the left-hand polarization signal that has been arranged on the high-band side shifts to the low-band side.

High pass filter 37B passes the frequency components included in the high band of the output signal of frequency controlling circuit 56D.

Signal coupler 38B combines the signal that has passed low pass filter 36B and the signal that has passed the high pass filter 37B and outputs a combined signal.

Next, the operation of signal rearranging circuit 55A is described.

OPERATION EXAMPLE 1

As one example, an operation is described where terminals M1 and M3 each output combined 119° signal, terminals M2 and M4 each output combined 110° signal, switch 34A of frequency controlling circuit 56A is on, switch 34B of frequency controlling circuit 56B is off, switch 34C of frequency controlling circuit 56C is off, and switch 34D of frequency controlling circuit 56D is on.

When switch 34A is on, frequency controlling circuit 56A outputs a signal in which 119° left-hand polarization signal is arranged on the low-band side, and 119° right-hand polarization signal is arranged on the high-band side.

Low pass filter 36A only passes 119° left-hand polarization signal included in the low band of the output signal of frequency controlling circuit 56A.

When switch 34B is off, frequency controlling circuit 56B outputs a signal in which 110° right-hand polarization signal is arranged on the low-band side, and 110° left-hand polarization signal is arranged on the high-band side.

High pass filter 37A only passes 110° left-hand polarization signal included in the high band of the output signal of frequency controlling circuit 56B.

Signal coupler 38A combines 119° left-hand polarization signal that has passed low pass filter 36A and 110° left-hand polarization signal that has passed high pass filter 37A, to output a combined signal A. Combined signal A is a signal in which 110° left-hand polarization signal is arranged on high-band side, and 119° left-hand polarization signal is arranged on low-band side.

When switch 34C is off, frequency controlling circuit 56C outputs a signal in which 119° right-hand polarization signal is arranged on the low-band side, and 119° left-hand polarization signal is arranged on the high-band side.

Low pass filter 36B only passes 119° right-hand polarization signal included in the low band of the output signal of frequency controlling circuit 56C.

When switch 34D is on, frequency controlling circuit 56D outputs a signal in which 110° left-hand polarization signal is arranged on the low-band side, and 110° right-hand polarization signal is arranged on the high-band side.

High pass filter 37B only passes 110° right-hand polarization signal included in the high band of the output signal of frequency controlling circuit 56D.

Signal coupler 38B combines 119° right-hand polarization signal that has passed low pass filter 36B and 110° right-hand polarization signal that has passed high pass filter 37B, to output a combined signal B. Combined signal B is a signal in which 110° right-hand polarization signal is arranged on high-band side, and 119° right-hand polarization signal is arranged on low-band side.

OPERATION EXAMPLE 2

As another example, an operation is described where terminals M1 and M3 each output combined 119° signal, terminals M2 and M4 each output combined 110° signal, switch 34A of frequency controlling circuit 56A is on, switch 34B of frequency controlling circuit 56B is on, switch 34C of frequency controlling circuit 56C is off, and switch 34D of frequency controlling circuit 56D is off When switch 34A is on, frequency controlling circuit 56A outputs a signal where 119° left-hand polarization signal is arranged on the low-band side, and 119° right-hand polarization signal is arranged on the high-band side.

Low pass filter 36A only passes 119° left-hand polarization signal included in the low band of the output signal of frequency controlling circuit 56A.

When switch 34B is on, frequency controlling circuit 56B outputs a signal in which 110° left-hand polarization signal is arranged on the low-band side, and 110° right-hand polarization signal is arranged on the high-band side.

High pass filter 37A only passes 110° right-hand polarization signal included in the high band of the output signal of frequency controlling circuit 56B.

Signal coupler 38A combines 119° left-hand polarization signal that has passed low pass filter 36A and 110° right-hand polarization signal that has passed high pass filter 37A, to output a combined signal A. Combined signal A is a signal in which 110° right-hand polarization signal is arranged on high-band side, and 119° left-hand polarization signal is arranged on low-band side.

When switch 34C is off, frequency controlling circuit 56C outputs a signal in which 119° right-hand polarization signal is arranged on the low-band side, and 119° left-hand polarization signal is arranged on the high-band side.

Low pass filter 36B only passes 119° right-hand polarization signal included in the low band of the output signal of frequency controlling circuit 56C.

When switch 34D is off, frequency controlling circuit 56D outputs a signal in which 110° right-hand polarization signal is arranged on the low-band side, and 110° left-hand polarization signal is arranged on the high-band side.

High pass filter 37B only passes 110° left-hand polarization signal included in the high band of the output signal of frequency controlling circuit 56D.

Signal coupler 38B combines 119° right-hand polarization signal that has passed low pass filter 36B and 110° left-hand polarization signal that has passed high pass filter 37B, to output a combined signal B. Combined signal B is a signal in which 110° left-hand polarization signal is arranged on high-band side, and 119° right-hand polarization signal is arranged on low-band side.

(Combinations of Output Signals)

FIG. 4 shows combinations of signals that can be output simultaneously through one cable by LNB 100. As shown in FIG. 4, combinations of signals that can be output are $4^2$. This is because LNB 100 enables, by the types of signals output from terminals M1 and M2 of 2×4 switching circuit 33 and by controlling on/off of switches 34A and 34B, arrangement of any signal of 119° right-hand polarization signal, 119° left-hand polarization signal, 110° right-hand polarization signal, and 110° left-hand polarization signal to each of the high-band side and low-band side of combined signal A. Further, this is because LNB 100 enables, by the types of signals output from terminals M3 and M4 of 2×4 switching circuit 33 and by controlling on/off of switches 34C and 34D of signal rearranging circuit 55A, arrangement of any signal of 119° right-hand polarization signal, 119° left-hand polarization signal, 110° right-hand polarization signal, and 110° left-hand polarization signal to each of the high-band side and low-band side of combined signal B.

As described above, according to the LNB and the satellite broadcasting receiving apparatus employing the LNB of the present embodiment, as signal rearranging circuit 55A generates combined signal A (or B), in which any signal of 119° right-hand polarization signal, 119° left-hand polarization signal, 110° right-hand polarization signal, and 110° left-hand polarization signal are arranged on each of high-band side and low-band side thereof, and outputs such combined signal A (or B), not only polarization signals from one satellite but also polarization signals from two satellites can be output simultaneously through one cable.

Further, as two of such combined signals are formed, such combined signals can be output to two tuners.

Second Embodiment

The present embodiment relates to an LNB where outputs of the LNB according to the first embodiment are expanded from two tuners to four tuners.

(Configuration of LNB 200)

Figure 5:
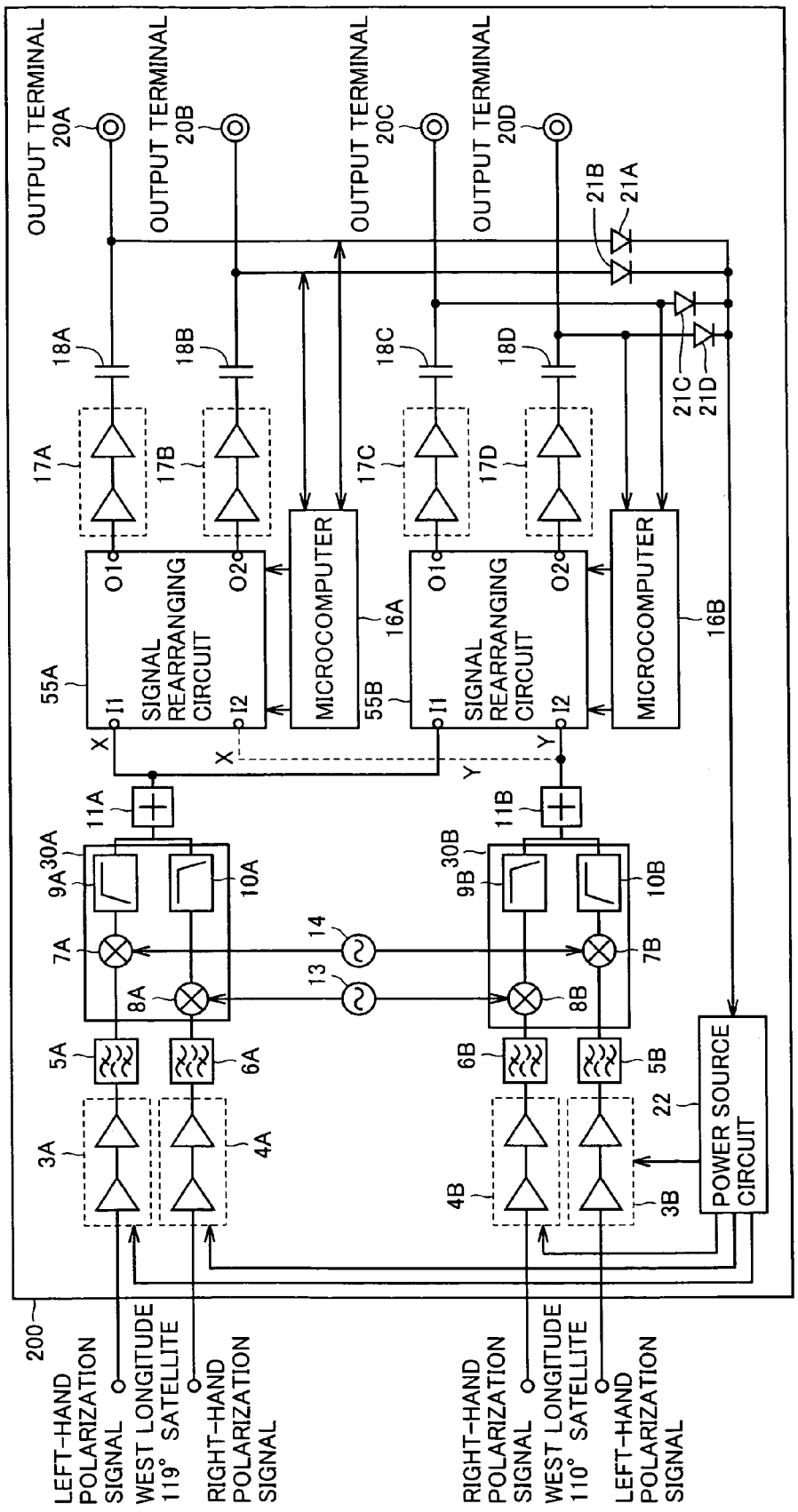
FIG. 5 shows a configuration of an LNB according to a second embodiment of the present invention.

FIG. 5 shows a configuration of an LNB according to the second embodiment of the present invention. LNB 200 includes, in addition to the components of LNB 100 according to the first embodiment shown in FIG. 2, a signal rearranging circuit 55B, a microcomputer 16B, intermediate frequency amplifiers 17C and 17D, capacitors 18C and 18D, and output terminals 20C and 20D.

Signal rearranging circuit 55B has similar configuration and operates similarly as signal rearranging circuit 55A according to the first embodiment.

Specifically, signal rearranging circuit 55B receives combined 119° signal and combined 110° signal from terminals I1 and I2, and outputs combined signals A and B to terminals O1 and O2.

Combined signal A is a signal in which any signal of 119° right-hand polarization signal, 119° left-hand polarization signal, 110° right-hand polarization signal, and 110° left-hand polarization signal are arranged to each of high-band side and low-band side. Combined signal B is similarly configured.

The combined signals output from terminals O1 and O2 of signal rearranging circuit 55B pass through intermediate frequency amplifiers 17C and 17D, and capacitors 18C and 18D, to be output from output terminals 20C and 20D.

(Combinations of Output Signals)

Combinations of output signals that can be simultaneously output through one cable are the same as LNB 100 according to the first embodiment, and they are $4^2$ as shown in FIG. 4.

As described above, according to the LNB and the satellite broadcasting receiving apparatus employing the LNB of the present embodiment, by using two signal rearranging circuits described in the first embodiment, four combined signals are arranged, in which any signal of 119° right-hand polarization signal, 119° left-hand polarization signal, 110° right-hand polarization signal, and 110° left-hand polarization signal are arranged on each of high-band side and low-band side, such combination signals can be output to four tuners.

Third Embodiment

The present embodiment relates to an LNB that can output polarization signals from two satellites simultaneously through one cable without using band converting/combining circuit 60A as in the first embodiment.

(Configuration of LNB 300)

Figure 6:
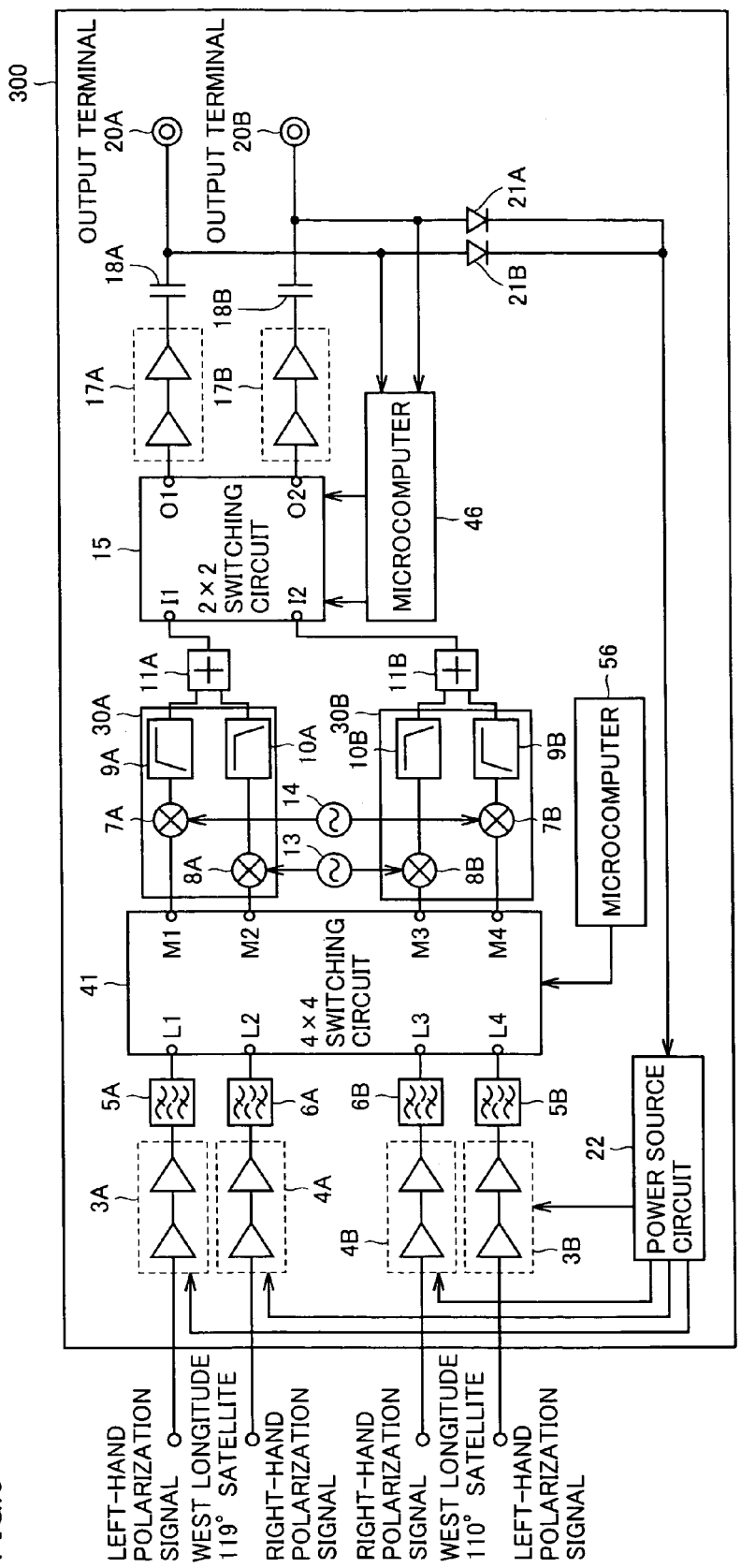
FIG. 6 shows a configuration of an LNB according to a third embodiment of the present invention.

FIG. 6 shows a configuration of the LNB according to the third embodiment of the present invention. LNB 300 is different from the conventional LNB 500 shown in FIG. 9 in that LNB 300 includes a 4×4 switching circuit 41, and a microcomputer 56. In the following, these differences are mainly described.

4×4 switching circuit 41 operates at the 0th frequency band (frequency 12.2 GHz–12.7 GHz).

4×4 switching circuit 41 receives, from image-remove filtering circuits 5A, 6A, 6B and 5B through terminals L1, L2, L3, and L4, 119° left-hand polarization signal that has been low-noise amplified and removed of image signals, 119° right-hand polarization signal that has been low-noise amplified and removed of image signals, 110° right-hand polarization signal that has been low-noise amplified and removed of image signals, and 110° left-hand polarization signal that has been low-noise amplified and removed of image signals.

4×4 switching circuit 41 follows the instruction of microcomputer 56 and outputs any of the above-mentioned signals to each of terminals M1, M2, M3, and M4. Accordingly, the combinations of signals output from terminals M1–M4 will be $4^4$.

Frequency converting circuit 30A converts the frequency bands of two polarization signals output from terminals M1 and M2 into two intermediate frequency (IF) bands that do not overlap with each other.

Signal coupler 11A performs frequency-multiplexing of the polarization signal that has been output from terminal M1 and frequency-converted by mixer 7A, and the polarization signal that has been output from terminal M2 and frequency-converted by mixer 8A, to output a combined signal A.

Frequency converting circuit 30B converts the frequency bands of two polarization signals output from terminals M3 and M4 into two intermediate frequency (IF) bands that do not overlap with each other.

Signal coupler 11B performs frequency-multiplexing of the polarization signal that has been output from terminal M3 and frequency-converted by mixer 8B, and the polarization signal that has been output from terminal M4 and frequency-converted by mixer 7B, to output a combined signal B.

2×2 switching circuit 15 receives combined signal A and combined signal B to output combined signal A or combined signal B to terminals O1 and 02. The combined signals output from terminals O1 and O2 pass through intermediate frequency amplifiers 17A and 17B, and capacitors 18A and 18B, to be output from output terminals 20A and 20B.

(Combinations of Output Signals)

Combinations of output signals that can be simultaneously output through one cable are the same as LNB 100 according to the first embodiment, and they are $4^2$ as shown in FIG. 4. This is because LNB 400 enables, by 4×4 switching circuit 41, arrangement of any signal of 119° right-hand polarization signal, 119° left-hand polarization signal, 110° right-hand polarization signal, and 110° left-hand polarization signal to the high-band side of combined signals A and B, and arrangement of any signal of 119° right-hand polarization signal, 119° left-hand polarization signal, 110° right-hand polarization signal, and 110° left-hand polarization signal to the low-band side of combined signals A and B.

As described above, according to the LNB and the satellite broadcasting receiving apparatus employing the LNB of the present embodiment, as 4×4 switching circuit 41 arranges 119° right-hand polarization signal, 119° left-hand polarization signal, 110° right-hand polarization signal, and 110° left-hand polarization signal to each of the high-band side and low-band side of combined signal A (or B), and as such combined signal A (or B) is output from the LNB, not only polarization signals from one satellite but also polarization signals from two satellites can be output simultaneously through one cable.

Further, as two of such combined signals are formed, such combined signals can be output to two tuners.

Fourth Embodiment

The present embodiment relates to an LNB in which polarization signals from two satellites can be output simultaneously through one cable, without using a band converting/combining circuit and a switching circuit operating at the 0th frequency band.

Figure 7:
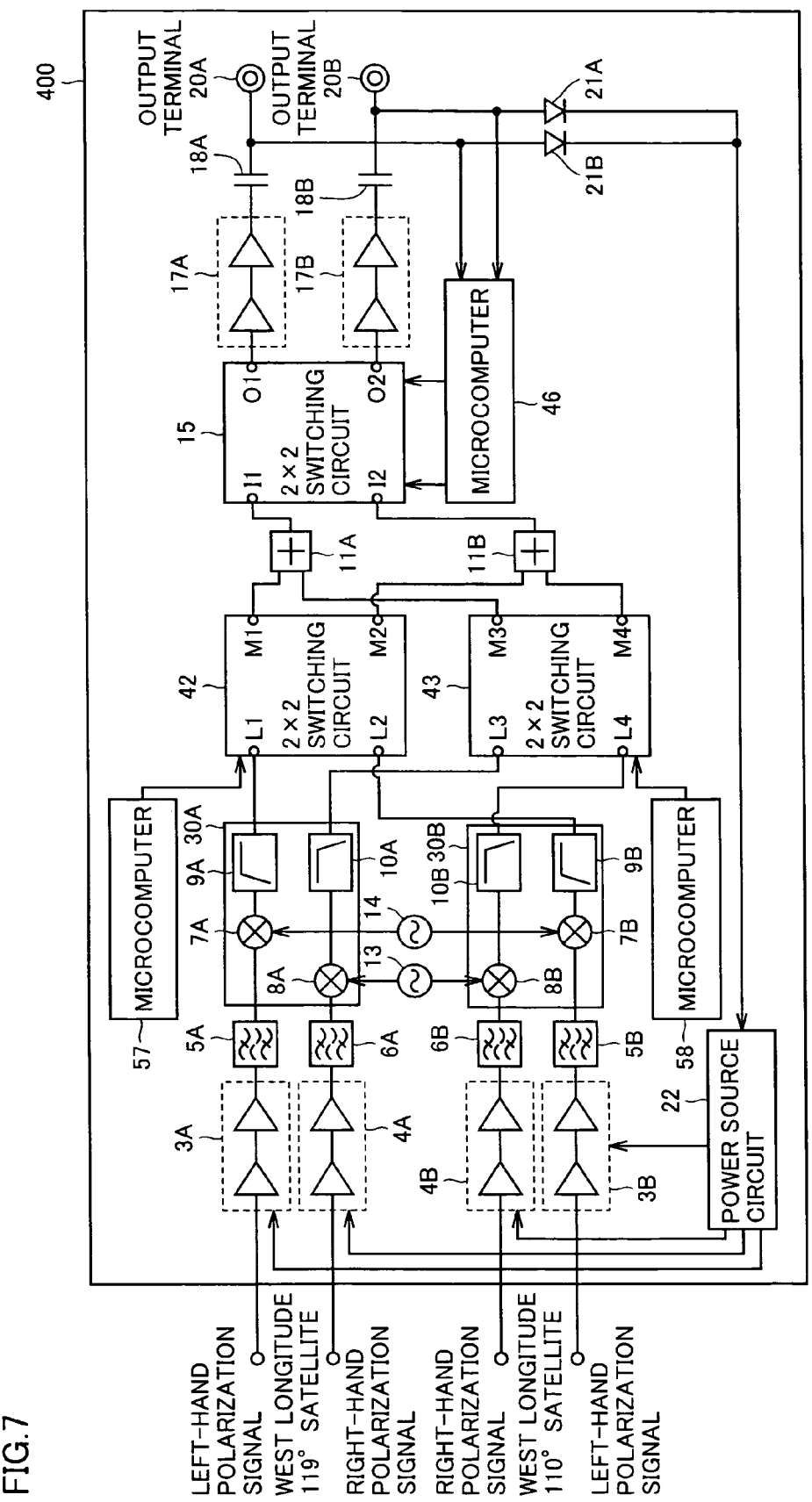
FIG. 7 shows a configuration of an LNB according to a fourth embodiment of the present invention.

FIG. 7 shows a configuration of an LNB according to the fourth embodiment of the present invention. LNB 400 is different from the conventional LNB 500 shown in FIG. 9 in that LNB 400 includes 2×2 switching circuits 42 and 43, and microcomputers 57 and 58. In the following, these differences are mainly described.

2×2 switching circuits 42 and 43 operates at IF frequency band (frequency 950 MHz–2150 MHz).

2×2 switching circuit 42 corresponds to left-hand polarization signals, and receives 119° left-hand polarization signal that has passed high pass filter 9A, and 110° left-hand polarization signal that has passed high pass filter 9B. 2×2 switching circuit 42 follows the instruction of microcomputer 57 and outputs the received signal, i.e., any of the above-mentioned signals to each of terminals M1 and M2. Accordingly, the combinations of signals output from terminals M1 and M2 are $2^2$.

2×2 switching circuit 43 corresponds to right-hand polarization signals, and receives 119° right-hand polarization signal that has passed low pass filter 10A, and 110° right-hand polarization signal that has passed low pass filter 10B. 2×2 switching circuit 43 follows the instruction of microcomputer 58 and outputs the received signal, i.e., any of the above-mentioned signals to each of terminals M3 and M4. The combinations of signals output from terminals M3 and M4 are $2^2$.

Signal coupler 11A performs frequency-multiplexing of the signals output from terminals M1 and M3, to output combined signal A. Signal coupler 11B performs frequency-multiplexing of the signals output from terminals M2 and M4, to output combined signal B.

2×2 switching circuit 15 receives combined signal A and combined signal B and outputs combined signal A or combined signal B to terminals O1 and O2. The combined signal output from terminals O1 and O2 pass through intermediate frequency amplifiers 17A and 17B and capacitors 18A and 18B, to be output from output terminals 20A and 20B.

(Combinations of Output Signals)

FIG. 8 shows combinations of signals that can be output simultaneously through one cable by LNB 400. As shown in FIG. 8, combinations of signals that can be output are $2^2$. This is because LNB 400 enables, by2×2 switching circuit 42, arrangement of either of 119° left-hand polarization signal and 110° left-hand polarization signal to the high-band side of combined signal A and B, and by 2×2 switching circuit 43, arrangement of either of 119° right-hand polarization signal and 110° right-hand polarization signal to the low-band side of combined signal A and B.

As described above, according to the LNB and the satellite broadcasting receiving apparatus employing the LNB of the present embodiment, as 2×2 switching circuits arrange either of 119° left-hand polarization signal and 110° left-hand polarization signal to the high-band side of combined signal A (or B), and arrange either of 119° right-hand polarization signal and 110° right-hand polarization signal to the low-band side of combined signal A (or B), and such combined signals are output from the LNB, not only polarization signals from one satellite but also polarization signals from two satellites can be output simultaneously through one cable.

Further, as two of such combined signals are formed, such combined signals can be output to two tuners.

Modification

The present invention is not limited to the embodiments described above, and it inherently includes the following modification as well.

1) As to the Number of Satellites and Polarization Signals

Though in the embodiments of the present invention two types of polarization signals are received from each of two satellites to generate a combined signal in which any of received polarization signals are arranged in each of two intermediate frequency bands, the present invention is not limited thereto. It is also possible to receive M (M≧2) types of signals from each of N (N≧2) satellites to generate a combined signal in which any of received polarization signals are arranged in each of M intermediate frequency bands.

In this case, the configurations of the embodiments are generally expanded as follows.

In the first and second embodiments, N frequency converting circuits are included, each of which converts frequency bands of M types of polarization signals into M intermediate frequency bands that do not overlap with one another, wherein each of N signal couplers perform frequency-multiplexing of M types of frequency-converted polarization signals.

The signal rearranging circuit selects M signals to be output from N combined signals that have been combined from polarization signals from the satellites, allowing duplicate selection, and takes out polarization signals included in the selected signals. Then, it combines thus taken out M polarization signals and outputs it.

The signal rearranging circuit includes, for one output, N×M switching circuit, M frequency controlling circuits and M filters, wherein the signal coupler performs frequency-multiplexing of the outputs of M filters. For two outputs, it includes N×(M×2) switching circuit, (2×M) frequency controlling circuits and (2×M) filters, wherein two signal couplers each perform frequency-multiplexing of the outputs of M filters.

According to the third embodiment, (N×M)×(M×2) switching circuits, and frequency converting circuits converting frequency bands of M types of polarization signals into M intermediate frequency bands that do not overlap with one another are included, wherein two signal couplers each perform frequency-multiplexing of M types of frequency-converted polarization signals.

According to the fourth embodiment, N frequency converting circuits each converting frequency bands of M types of polarization signals into M intermediate frequency bands that do not overlap with one another, and M of N×2 switching circuits are included, wherein two signal couplers each perform frequency-multiplexing of the outputs of the corresponding terminals of M switching circuits.

2) Configuration of the Second Embodiment

In the second embodiment, the configuration including two signal rearranging circuits including 2×4 switching circuits 33 having two inputs and four outputs has been described. However, in place of this configuration, it is also possible to include one signal rearranging circuit having 2×8 switching circuit with two inputs and eight outputs.

3) The Number of Output Signals

Though the first, third and fourth embodiments of the present invention show two combined signals are output, and the second embodiment show four combined signals are output, the present invention is not limited thereto.

In the first embodiment, it is possible to include 2×K switching circuit in place of 2×4 switching circuit 33, thereby outputting K combined signals.

Further, in the second embodiment, it is possible to include K signal rearranging circuits in place of two signal rearranging circuits, thereby outputting 2×K signals.

Still further, in the third and fourth embodiments, it is possible to include 2×K switching circuit in place of 2×2 switching circuit 15, thereby outputting K combined signals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A low-noise block down-converter receiving M (M≧2) types of polarization signals from each of N (N≧2) satellites, comprising:

N frequency converting circuits each corresponding to one satellite and converting frequency bands of M types of polarization signals received from the corresponding satellite into M intermediate frequency bands that do not overlap one another;

N first signal couplers each corresponding to one satellite and performing frequency-multiplexing of said M types of polarization signals from the corresponding satellite having their frequency bands converted, to generate a first combined signal; and a signal rearranging circuit selecting any M first combined signals from N of said first combined signals allowing duplicate selection, taking out any one polarization signal from each of the selected first combined signals, and performing frequency-multiplexing of the taken out M polarization signals to generate at least one second combined signal.

2. The low-noise block down-converter according to claim 1, wherein said signal rearranging circuit includes a switching circuit including N input terminals and M output terminals, receiving N of said first combined signals and outputting any of said received first combined signals to each of M output terminals, M frequency controlling circuits each receiving said first combined signal output from a corresponding one of said output terminals and setting signal components included in a corresponding band of said received first combined signal to be any polarization signals included in said received first combined signal, M filters each passing signal components of a corresponding band of an output signal of a corresponding one of said frequency controlling circuits, and a second signal coupler performing frequency-multiplexing of the output signals of said M filters, to generate a second combined signal.

3. The low-noise block down-converter according to claim 2, wherein said frequency controlling circuits each include a switch that can be switched arbitrarily, and a mixer, said switch receives said first combined signal output from a corresponding one of said output terminals, and outputs said first combined signal to said filter without any change in a first state, and outputs said first combined signal to said mixer in a second state, and said mixer mixes said first combined signal and a signal of a prescribed frequency, and outputs the mixed signal to said filter.

4. The low-noise block down-converter according to claim 1, wherein said low-noise block down-converter includes K (K≧2) of said signal rearranging circuits;

each signal rearranging circuit includes a switching circuit including N input terminals and 2×M output terminals, receiving N of said first combined signals and outputting any of said received first combined signals to each of 2×M output terminals, 2×M frequency controlling circuits each receiving said first combined signal output from a corresponding one of said output terminals and setting signal components included in a corresponding band of said received first combined signal to be any polarization signals included in said received first combined signal, 2×M filters each passing signal components of a corresponding band of an output signal of a corresponding one of said frequency control circuits, and two second signal couplers each performing frequency-multiplexing of the output signals of M filters of said 2×M filters, to generate a second combined signal.

5. A satellite broadcasting receiving apparatus comprising a low-noise block down-converter according to claim 1.

6. A low-noise block down-converter, comprising:

a switching circuit including N×M(N≧2, M≧2) input terminals and M output terminals, receiving M types of polarization signals from each of N satellites, and outputting any of said received polarization signals to each of M output terminals;

a frequency converting circuit converting frequency bands of M polarization signals output from said switching circuit into M intermediate frequency bands that do not overlap with one another; and a signal coupler performing frequency-multiplexing of said M polarization signals having their frequency bands converted, to generate a combined signal.

7. The low-noise block down-converter according to claim 6, further comprising another switching circuit and e signal coupler.

8. A satellite broadcasting receiving apparatus comprising a low-noise block down-converter according to claim 6.

9. A low-noise block down-converter receiving M (M≧2) types of polarization signals from each of N (N≧2) satellites, comprising:

N frequency converting circuits each corresponding to one satellite and converting frequency bands of M types of polarization signals received from the corresponding one satellite into M intermediate frequency bands that do not overlap one another;

M switching circuits each corresponding to a type of said polarization signals, and receiving a corresponding one type of said polarization signals from N satellites having its frequency band converted, and outputting any of said received polarization signals; and a signal coupler receiving said M polarization signals from said M switching circuits and performing frequency multiplexing of said M polarization signals to generate a combined signal.

10. The low-noise block down-converter according to claim 9, further comprising another switching circuit downstream of the signal coupler.

11. A satellite broadcasting receiving apparatus comprising a low-noise block down-converter according to claim 9.

12. A satellite broadcasting receiving apparatus receiving M (M≧2) types of polarization signals from each of N (N≧2) satellites, comprising:

a low-noise block down-converter including

N frequency converting circuits each corresponding to one satellite and converting frequency bands of M types of polarization signals received from the corresponding satellite into M intermediate frequency bands that do not overlap one another;

N signal couplers each corresponding to one satellite and performing frequency-multiplexing of said M types of polarization signals from the corresponding satellite having their frequency bands converted, to generate a first combined signal; and a signal rearranging circuit selecting any M first combined signals from N of said first combined signals allowing duplicate selection, taking out any one polarization signal from each of the selected first combined signals, and performing frequency-multiplexing of the taken out M polarization signals to generate a second signal; and a tuner receiving said second combined signal output from said low-noise block down-convener, and performing a tuning process and a decoding process based on said second combined signal.

13. A low-noise block down-converter receiving M (M≧2) types of polarization signals from each of N (N≧2) satellites, comprising:
- N frequency converting circuits each corresponding to one of the satellites and each converting frequency bands of M types of polarization signals received from the corresponding satellite into M non-overlapping intermediate frequency bands;
- N first signal couplers each corresponding to one of the satellites and each frequency-multiplexing the M types of frequency-converted polarization signals from the corresponding satellite, to generate a respective first combined signal; and
- a signal rearranging circuit selecting any M first combined signals from the N first combined signals, taking out any one polarization signal from each of the selected first combined signals, and frequency-multiplexing the taken out M polarization signals to generate at least one second combined signal,
- wherein the signal rearranging circuit allows for duplicate selection of one or more of the N first combined signals.

14. The low-noise block down-converter according to claim 13, wherein the signal rearranging circuit comprises:
- a switching circuit including N input terminals and at least M output terminals, wherein each of the N input terminals receives a corresponding one of the N first combined signals and wherein any of the received first combined signals can be switched to any of the M output terminals;
- M frequency controlling circuits each of which selectively frequency-controls a first combined signal from a corresponding one of the output terminals of the switching circuit;
- M filters each filtering signals from a corresponding one of the frequency controlling circuits; and
- a second signal coupler for frequency-multiplexing outputs of the M filters to generate a second combined signal.

15. The low-noise block down-converter according to claim 14, wherein each frequency controlling circuit comprises a switch and a mixer and wherein the switch has a first state in which the first combined signal supplied thereto is output from the frequency controlling circuit unchanged and a second state in which the first combined signal supplied thereto is mixed with another signal by the mixer before being output from the frequency controlling circuit.

16. The low-noise block down-converter according to claim 13, wherein said signal rearranging circuit comprises multiple signal rearranging circuit sections, each signal rearranging circuit section including:
- a switching circuit including N input terminals and at least 2×M output terminals, wherein each of the N input terminals receives a corresponding one of the N first combined signals and wherein any of the received first combined signals can be switched to any of the 2×M output terminals;
- 2×M frequency controlling circuits each of which selectively frequency-controls a first combined signal from a corresponding one of the output terminals of the switching circuit;
- 2×M filters each filtering signals from a corresponding one of the frequency controlling circuits; and
- M second signal couplers each frequency-multiplexing outputs of M filters to generate a respective second combined signal.

17. The low-noise block down-converter according to claim 16, wherein each frequency controlling circuit comprises a switch and a mixer and wherein the switch has a first state in which the first combined signal supplied thereto is output from the frequency controlling circuit unchanged and a second state in which the first combined signal supplied thereto is mixed with another signal by the mixer before being output from the frequency controlling circuit.

* * * * *

UNITED STATES PATENT AND TRADEMARK OFFICE
Certificate

Patent No. 7,212,782 B2                                                Patented: May 1, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hiroshi Atarashi, Kashihara (JP); and Edmund F. Petruzzelli, Centennial, CO (US).

Signed and Sealed this Thirtieth Day of October 2012.

*DUC NGUYEN*
*Supervisory Patent Examiner*
*Art Unit 2618*
*Technology Center 2600*